United States Patent
Warren

[15] 3,648,749
[45] Mar. 14, 1972

[54] FASTENER ASSEMBLY WITH LOCKING CAPABILITIES

[72] Inventor: Ross B. Warren, Keene, N.H.
[73] Assignee: Central Screw Company
[22] Filed: Feb. 5, 1970
[21] Appl. No.: 8,948

[52] U.S. Cl. .................................. 151/33, 85/9, 151/62
[51] Int. Cl. ................................................. F16b 39/02
[58] Field of Search ................ 151/5, 33, 63, 34, 66, 60, 151/61, 62, 45, 68; 85/9, 53

[56] References Cited

UNITED STATES PATENTS

| | | | |
|---|---|---|---|
| 1,090,908 | 3/1914 | Dimock | 151/5 |
| 1,320,095 | 10/1919 | Robinson | 151/5 |
| 1,137,569 | 4/1915 | Boon | 151/33 |
| 3,152,507 | 10/1964 | Wieber | 151/33 |
| 627,568 | 6/1899 | Brookman | 151/66 |

FOREIGN PATENTS OR APPLICATIONS

| | | | |
|---|---|---|---|
| 1,255,116 | 1/1961 | France | 151/33 |
| 733,821 | 4/1943 | Germany | 151/33 |

Primary Examiner—Edward C. Allen
Attorney—Hofgren, Wegner, Allen, Stellman & McCord

[57] ABSTRACT

A cooperating fastener and fitting used to anchor the fastener against loosening. The fastener employs a slotted head fastener, the fitting being captured in position relative to the head and having apertures aligned with the slot in the fastener head to receive a wire, rod or the like.

6 Claims, 7 Drawing Figures

PATENTED MAR 14 1972 3,648,749
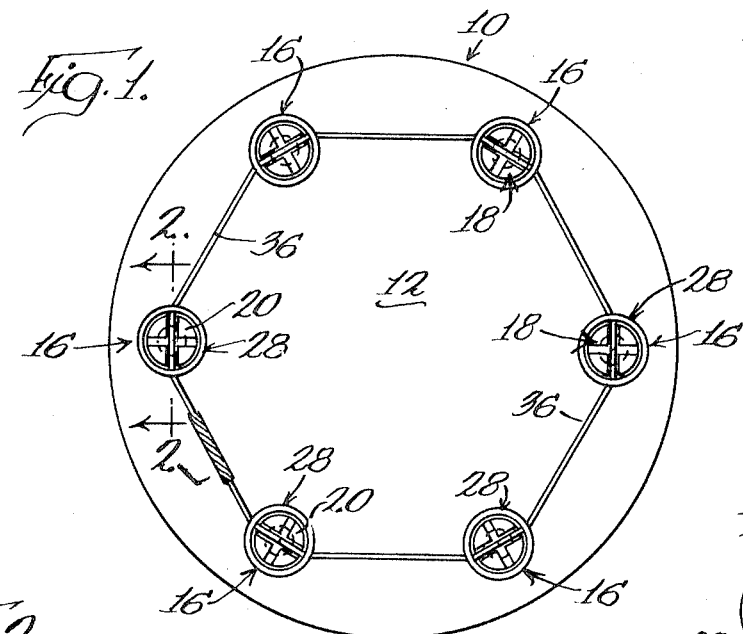
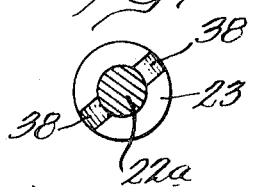
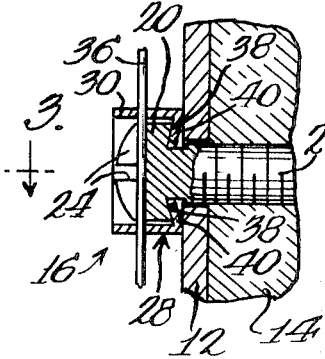
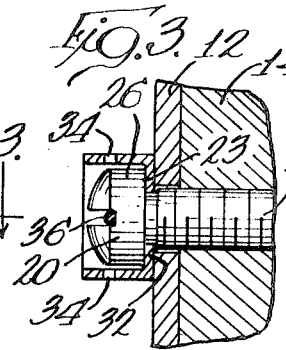
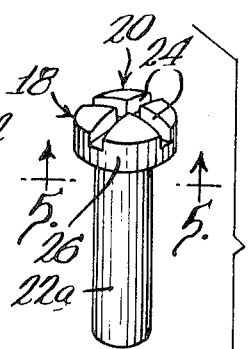
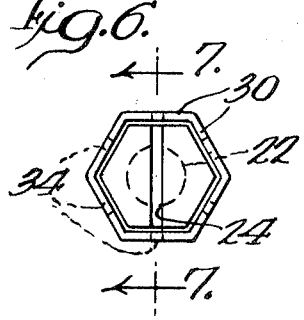
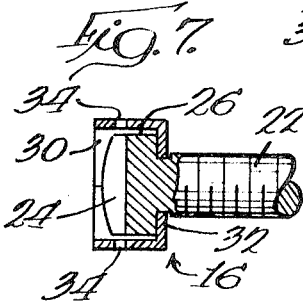
Inventor:
Ross B. Warren
By Hofgren, Wegner,
Allen, Stellman & McCord
Att'ys

FASTENER ASSEMBLY WITH LOCKING CAPABILITIES

BACKGROUND OF THE INVENTION

The present invention relates to a new and useful threaded fastener which fastens two or more piece parts together to provide assemblies which will not become loose through vibration or other means by virtue of tying or wiring adjacent fasteners to each other or individual fasteners to a stationary base.

It has long been known that rotating type fasteners such as bolts or screws may be locked so as to prevent unintentional loosening by vibration or other causes. Methods previously used to make fasteners with these capabilities have been expensive. Economically minded craftsmen in recent years have avoided positive locking methods in lieu of less expensive but also less positive methods such as lock washers.

Those skilled in the art have used locking means of the type described in U.S. Pat. No. 1,166,220, issued to M. J. Jeanott, entitled "Bolt Lock". This method of locking a bolt as well as others, requires drilling the head portion of the bolt as well as drilling holes in a metal piece for the ends of a wire or rod to fit therethrough. Even though this configuration prevents the relative rotation of the bolt to the metal locking member, there is still required the step of drilling a hole in the head portion of the bolt. In other words, any bolt-locking member combination which has heretofore been employed has had to be made special, i.e., conventional bolts were not able to be used.

As an example, in aircraft engine assemblies, wired together machine screws were used—each screw head being cross-drilled to receive the wire. Such screws were extraordinarily expensive, though effective.

SUMMARY OF THE INVENTION

The main object of this invention is to provide a positive locking threaded fastener which is capable of accepting an external lock such as wires or rods to prevent failure of mechanical assemblies due to the unscrewing of a fastener because of vibration. The fastener can be assembled and disassembled by nondestructive methods for repair or replacing the various other parts of the assembly and is economical to use and manufacture.

The invention contemplates the use of a metal fitting captivated at the underside of a head of a conventional slotted screw fastener by reason of being assembled on the shank of the fastener prior to rolling the thread formation on the shank. It is intended that the fitting will have side surfaces of the same configuration as the side surfaces of the head which, in the case of a wrench flat equipped head, can be used to hold the fitting against rotation relative to the fastener. In the case of round headed machine screws, other means anchor the fitting in place on the fastener. The fitting has at least two openings on opposite sides of the head through which a wirelike member may pass. When the fitting openings are aligned with the slot in the head of a screw and a wirelike member is extended through the slot and openings and then anchored, any relative rotation between the screw and the workpiece is effectively prevented.

In the case of round headed fasteners the underside of the fastener head and the bottom portion of the fitting are provided with complementary mating surfaces for registering the aligned openings in the fitting with the slot in the fastener head.

Another embodiment of the invention employs a fastener having a head that is not round, e.g., a square or hexagonal head with conventional wrench flats. The fit between the complementary side surfaces of the fastener head and a sheet metal fitting provides means for aligning the openings in the wall of the fitting with a slot in the fastener head, thereby preventing relative rotation between the fitting and fastener.

BRIEF DESCRIPTION OF THE DRAWINGS

FIG. 1 is a plan view of an assembly employing fasteners made according to the invention;

FIG. 2 is a fragmentary side elevational section taken generally through the line 2—2 of FIG. 1;

FIG. 3 is a side elevational section taken generally through the line 3—3 of FIG. 2;

FIG. 4 is a perspective view of the component parts of an embodiment of the invention prior to assembly;

FIG. 5 is a plan view section taken generally through the line 5—5 of FIG. 4;

FIG. 6 is a plan view of another embodiment of the invention; and

FIG. 7 is a fragmentary side elevational section taken generally through the line 7—7 of FIG. 6.

DESCRIPTION OF THE PREFERRED EMBODIMENT

For purposes of illustration, the invention has been shown as applied to machine screws which are utilized to hold together sections of a workpiece, generally designated 10. The workpiece 10 is generally comprised of two pieces 12 and 14 which are sought to be fastened together by screw fasteners generally designated 16 made according to the present invention.

Each of the fasteners 16 employs a conventional machine screw 18 having the usual head portion 20 and threaded shank 22. The shank 22 passes through the base piece 12 and is threaded into a correspondingly tapped bore formed in the section 14 of the workpiece 10. The head 20 of each of the bolts 18 is provided with an underside surface 23 and a pair of mutually perpendicular transversely extending screwdriver slots 24 which extend entirely across the top surface of the fastener head and intersect the opposite side 26 of the head portion 20. The slots 24 are used for both driving and locking the bolt 18 into the workpiece 10.

Generally applicable to all configurations of the invention, a locking member or fitting generally designated 28 is a cup-shaped washerlike sheet metal stamped fitting which when associated with the screw 18 comprises the fastener 16 as manufactured. The locking member 28 has a sidewall portion 30 and a bottom wall portion 32. The bottom portion 32 has a central opening defined by edges 33 (FIG. 4) for receiving the fastener shank 22a while in blank form prior to rolling the threads thereon. The opening in the bottom wall is just large enough to be assembled over the round stock shank by automatic machinery. As a result of thread forming on the shank 22a, the locking member 28 is captivated underneath the head 20 of the bolt 18.

The side portion 30 of the locking member 28 is so formed that it will closely complement and mate with the side surfaces 26 of the head 20. A pair of apertures 34 are provided in opposite sides of the side portion 30 of the locking member 28. These apertures 34 are diametrically located to align with one slot 24 of the head portion 20 of the screw 18, permitting a cotter pin or high tensile wire 36 to be inserted through the apertures 34 and the slot 24. In some configurations, such as on hex-head screws, a pair of apertures will be provided in each pair of oppositely arranged sidewalls of the locking member in order to simplify factory assembly procedures.

There are slightly different configurations of the fitting in order to complement the particular fastener head design. More specifically, in FIGS. 2–5 a round headed screw fastener 16 is shown. On the underside of the head 23 are at least two recesses 38 having a predetermined circumferential relationship with the slots 24 as shown in FIG. 5. The relationship is established by the heading dies used to form the head on the wire stock used to make the fastener. Complementary mating tabs or fingers 40 are provided in the bottom portion 32 of the locking member 28. When the locking member is assembled on the headed fastener blank, the tabs 40 on the fitting 28 are received within the recesses 38. The tabs 40 are dimensional to fit into the recesses 38 on the underside of the head so that the side edges of the tabs bear circumferential on the sidewalls of the recesses. The side edges are of the thickness of the sheet metal of the fitting and arranged generally more toward radial than circumferential so as to oppose rotation of the fitting relation to the fastener when the tabs are positioned in the recesses. Apertures 34 are positioned relative to the tabs so as to align with the slots in the fastener head, upon assembly. There may be a reversal of parts and still have the same functional relationship, i.e., element 38 may comprise a protuberance while element 40 may be a recess. The locking member 28 and the fastener head 20 are thereby held in a position so that the apertures 34 and the slot 24 are in alignment.

FIGS. 6-7 illustrate another embodiment of the invention which employs a hexagonal headed screw fastener 20. The side surfaces of the head 20 and the side portion 30 of the locking member 28 are mating surfaces which inherently provide means for aligning the apertures 34 with the slot 24. As can be appreciated by those skilled in the art, any multiple-sided headed fastener may be employed with a mating and complementary shaped locking fitting with the same results.

In the drawings, parts have been illustrated with visible clearance between them for the purpose of clarity only. In practice, the locking fitting shown in FIG. 4 will have walls 30 whose inner surface will closely abut the round surface 26 of the fastener head. Likewise, while clearance is shown between the sidewalls of the hex-head locking fitting in FIG. 6 and its complementary screwhead, in practice the fit between the walls will be as close as manufacturing techniques and assembly processes will permit. In each form, the fitting has a hole in its bottom wall that will allow assembly over the cylindrical shank before threads are rolled on the shank. Thread rolling procedures provide enough upset of the metal to capture and secure the fitting on the fastener as well as to snugly force the bottom wall of the fitting against the underside of the fastener head. In use, the assembled, finished fastener will have the locking washer 28 secured in position ready for such use. In tightening the screw fastener into any workpiece, the underside of the head 23 will bear against the bottom wall of the locking fitting which will in turn bear against the workpiece. It is desirable therefore that the cuplike locking fitting 28 be close about the fastener head and particularly desirable that there be metal to metal bearing between the bottom wall 32 of the fitting and the underside surface 23 of the fastener head. In some instances, the fastener thread need not be close enough to the head of the screw to initially hold the locking member nonrotatively relative to the screw. As such a screw is tightened in the assembly, the friction of the locking member against a workpiece may retard rotation until the head and member come to an interfering, nonrotative relationship.

Upon using the fastener to assemble and fasten two or more components of a final assembly 12 and 14, it will be noted that the apertures 34 in the side portion of the locking member 30 is in perfect alignment with the slot 24 of the screw head 20. A wire or rod 36 may be inserted through the apertures 34 of the locking member 28 and drawn tightly into the slot 24 of the bolt head 20. This wire or rod 36 may extend continuously through several such heads locking all of them to prevent loosening as shown in FIG. 1. As an example, small aircraft engines have usually had cylinders bolted to a crank case with the fasteners wired together to prevent loosening and FIG. 1 illustrates such an arrangement. In the event of only using one bolt the head may be so wired to some other part of the assembly 10.

When required removal of the fasteners is warranted for repairs or replacement of the assembled components, the wire 36 can be removed and the screws unfastened in the conventional manner.

The fastener provides specially designed locking members and fasteners assembled together as a one piece part for fastening two or more parts of assembly together with capabilities for anchoring such fasteners against loosening. The resulting fastener can be formed economically without the great expense of drilling holes through the heads of fasteners as has been done in the past.

In use, the apertures in the sheet metal fitting serve to hold the wire in the slot in the head. Ordinarily the locking wire is drawn taut providing sufficient resistance to any vibration loosening of the screw fastener. The positive retention of the wire in the fastener head slot may be more economically achieved with as satisfactory locking results as with the previously known cross-drilled fasteners.

I claim:

1. A fastener capable of being securely locked to a base against loosening comprising:
   a threaded shank;
   a head surmounting the shank for manipulative rotation of the shank about its longitudinal axis into the mating base, said fastener head having walls therein forming at least one outwardly open cross channel extending generally across the longitudinal axis of the shank;
   a locking element including a bottom portion under the head, a side portion extending about the head, cooperating means associated with the locking element and head to retain the locking element and fastener head in a nonrotative relationship with respect to one another, and means forming apertures through the side portion of the element said apertures being in alignment with the cross channel for receiving an elongated locking wire guided through such apertures and said channel.

2. The fastener of claim 1 wherein the locking element comprises: a sheet metal cup embracing the fastener head, said cup having an opening in the bottom portion thereof for receiving the shank, said thread on the shank captivating the locking element to the fastener.

3. The fastener of claim 2 wherein the fastener head is round and includes at least one recess in the underside thereof, said nonrotative cooperating means including a mating ear on the locking element engaging in the recess under the head.

4. The fastener of claim 2 wherein the fastener head has a wrench flat and at least one side portion of the cup being of mating configuration to and engaging the wrench flat with the remainder of the cup retaining said mating wrench flat and cup wall in engagement.

5. The fastener of claim 2 in which the fastener head has a plurality of planar sidewalls in the nature of wrench flats, the sheet metal cup has mating walls closely embracing the planar sidewalls of the fastener head and is maintained in nonrotative relation to the fastener by such embracing.

6. The fastener of claim 1 in which the locking element is a cup-shaped member having an opening therein surrounding the fastener shank and wall portions closely about sides of the head, said head having recesses in its underside adjacent its shank with abutments extending in an outward direction relative to the shank, said cup-shaped member having a portion abutting such abutments to hold the locking element against rotation relative to said fastener.

* * * * *